United States Patent [19]

Danforth et al.

[11] Patent Number: 4,970,389
[45] Date of Patent: Nov. 13, 1990

[54] VEHICLE IDENTIFICATION SYSTEM

[76] Inventors: John Danforth, 875 - 29th Ave., San Francisco, Calif. 94121; William Taylor, P.O. Box 44, Kealakekua, Hi. 96750

[21] Appl. No.: 372,588

[22] Filed: Jun. 27, 1989

[51] Int. Cl.$^5$ ............................................. G06K 7/10
[52] U.S. Cl. ..................................... 250/271; 156/240; 156/663; 313/509
[58] Field of Search ............... 250/221; 313/509; 354/75; 156/240, 663; 356/232; 40/495

[56] References Cited

U.S. PATENT DOCUMENTS

| 3,807,859 | 4/1974 | Sugaya. | |
|---|---|---|---|
| 4,368,979 | 1/1983 | Ruell | 250/271 |
| 4,585,514 | 4/1986 | Scallan | 156/663 |
| 4,645,970 | 2/1987 | Murphy | 313/509 |
| 4,652,332 | 3/1987 | Dicone et al. | 156/240 |
| 4,781,792 | 11/1988 | Hogan | 156/663 |

FOREIGN PATENT DOCUMENTS

| 2805833 | 8/1979 | Fed. Rep. of Germany. |
| 2811217 | 9/1979 | Fed. Rep. of Germany. |
| 2834337 | 2/1980 | Fed. Rep. of Germany. |
| 2566345 | 12/1985 | France. |

Primary Examiner—Janice A. Howell
Assistant Examiner—Kiet T. Nguyen
Attorney, Agent, or Firm—Townsend and Townsend

[57] ABSTRACT

Vehicle (4) are automatically identified using a specially constructed windshield (8) which carries identifying indicia (10). The window is a layered construction, similar to safety glass, and includes an intermediate layer (20) sandwiched between inner and outer glass layers (22, 24). The intermediate layer carries the identifying indicia, typically in a bar coded pattern. The indicia are invisible to the unaided human eye but are detectable when illuminated with a chosen electromagnetic radiation, typically infrared light from a $CO_2$ laser. The bar coded indicia are preferably unique to the particular vehicle. Since the bar coded indicia can cover substantially an entire windshield, and since windshields are normally kept clean, sensing of the indicia is aided. The vehicle identification system thus permits the non-invasive identification of a vehicle even under adverse environmental condition.

20 Claims, 2 Drawing Sheets

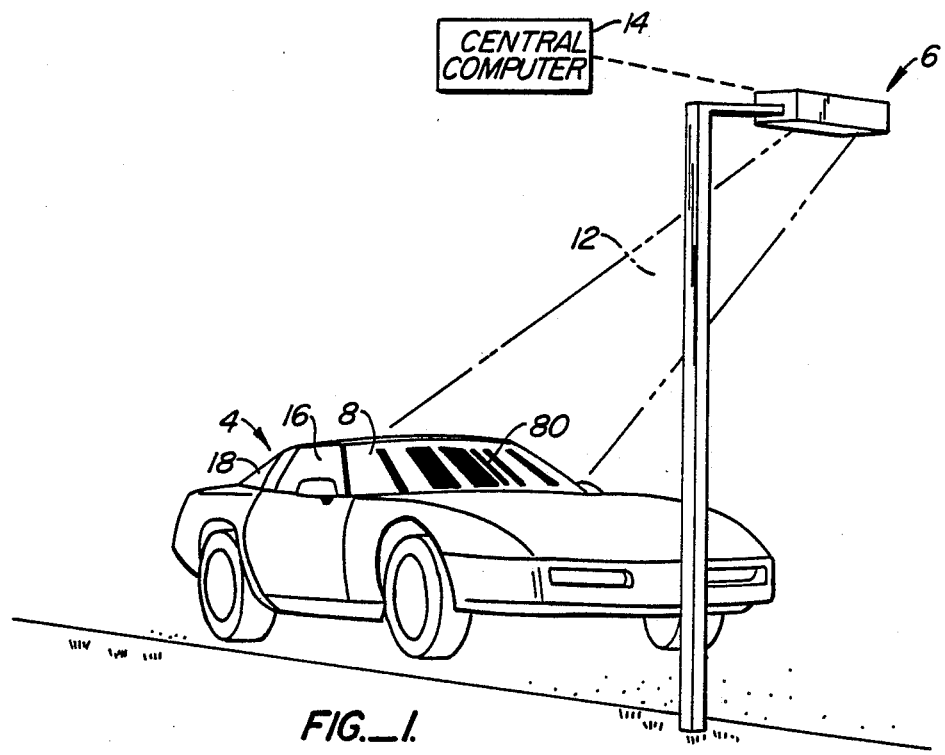
FIG._1.
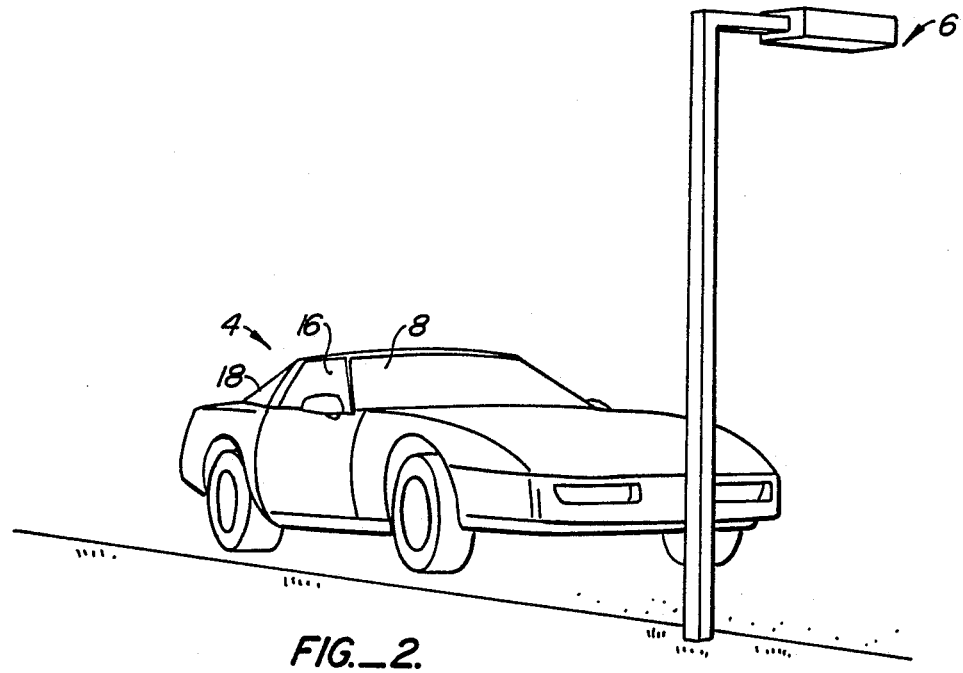
FIG._2.

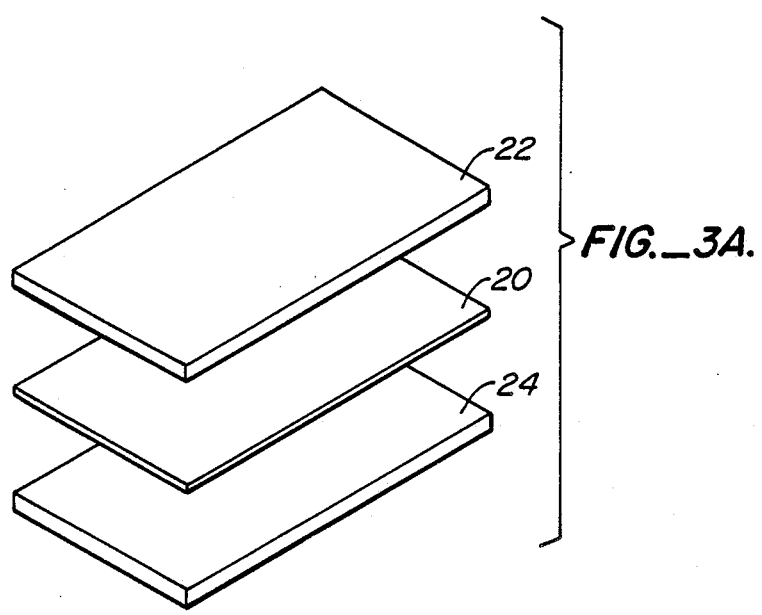
FIG._3A.
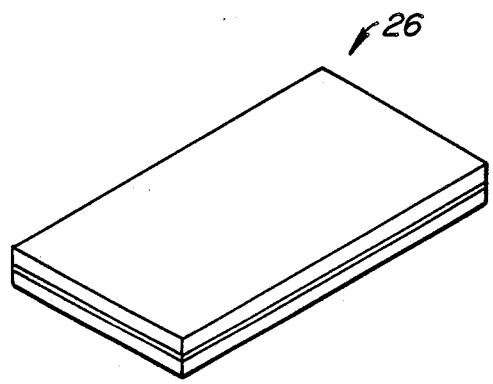
FIG._3B.

VEHICLE IDENTIFICATION SYSTEM

BACKGROUND OF THE INVENTION

This invention relates to vehicle identification systems, in particular one which permits the non-invasive identification of a vehicle even under adverse environmental condition.

Vehicle identification systems have been developed for a number of purposes. One purpose is to permit law enforcement agencies to quickly check whether a vehicle has been stolen or has forged license plates. One such system is shown in U.S. Pat. No. 4,368,979 to Ruell. This system combines the alphanumeric information carried by a license plate with a hologram including information which cannot be seen by the unaided human eye and also must be decoded to be understandable. Although such a system could be used to identify vehicles, the identifying hologram is limited as to size. Also, the recommended placement of the identifying hologram at or near the rear license plate creates a situation in which the hologram can be obscured by snow, ice and mud, which often accumulates on vehicles, as well as by other vehicles.

SUMMARY OF THE INVENTION

The present invention is directed to a system by which vehicles can be readily identified in a non-invasive manner under a variety of adverse environmental conditions, including while the vehicle is traveling at high speeds.

Vehicles are automatically identified by using at least one specially constructed window, typically the windshield, which carries identifying indicia. The window is a layered construction, similar to safety glass, and includes an intermediate layer sandwiched between inner and outer, typically glass layers. The intermediate layer carries the identifying indicia, typically a holographic bar coded pattern. The indicia are invisible to the unaided human eye but are detectable when illuminated with a chosen electromagnetic radiation, preferably infrared light from a $CO_2$ laser. The bar coded indicia are preferably unique to 5 the particular vehicle.

An important aspect of the invention is the recognition that by using one or more windows of the vehicle, a relatively large indicia area, in contrast with the prior art license plates, is available for the display of the indicia. This is especially true when the indicia are provided on the front windshield and/or rear window of the vehicle. Providing such a large indicia area permits the vehicle identification to be interrogated at a much greater distance than would otherwise be possible. Also. when vehicle interrogation is from a fixed position along a roadway, vehicle speed need not be a problem. Since vehicles need not slow down to have the indicia interrogated, flow of traffic is not impeded.

Another important feature of the invention is the provision of the indicia, typically created on a plastic film, as an intermediate layer between two, typically glass, layers to provide a sandwiched window. Preferably the window glass will be formed as safety glass as is presently used in the manufacture of vehicle windows. The indicia carried by the intermediate layer is thus protected from oxidation, and other types of corrosion, abrasion and the like. Also, physical tampering and damage is also substantially prevented. Other techniques instead of creating the indicia using holographic techniques, can be used to create the indicia. For example part of the plastic laminant can be impregnated with dye-mediated codes sensitive to infrared light (or other bands of radiation) sensitive dyes. Illuminating the window with the infrared light discloses the indicia to appropriate sensors.

An advantage of incorporating the indicia in one or more of the vehicle windows is that obscuring material, such as snow, ice, and mud, which so commonly collects on license plates and other body parts, is not generally allowed to collect on windows; rather, windows are generally kept relatively clean. This is especially true with windshields which, for safety reasons, are usually kept quite clean.

Incorporating the indicia into the permanently mounted windshield makes the system of the invention much more difficult to forge. One would need to develop the necessary, typically sophisticated, technology to create not only the laminated safety glass but also the radiation sensitive indicia. This is especially true for windshields which have complex shapes. Also, replacement windshields could be controlled by the appropriate authorities to keep track of their whereabouts.

The use of the system is quite varied. It can be used to identify speeding vehicles passing beneath a bridge on a highway as well as to charge vehicles for use of a toll road. Stolen and other suspect vehicles can be monitored at unobtrusive check points. The invention can be used to monitor sensitive areas, such as military bases, defense research facilities, financial institutions and so forth. A computerized system can be used with the invention to store and process a great variety of information about identified vehicles. For example, the computerized system could provide the last known detection point for a wanted vehicle. In addition to providing information as to specific vehicles, such a system could be used to provide information as to total vehicle flow and vehicle flow as to type (autos, busses, etc.) for better traffic management.

Other features and advantages of the invention will appear from the following description in which the preferred embodiment has been set forth in detail in conjunction with the accompanying drawings.

BRIEF DESCRIPTION OF THE DRAWINGS

FIG. 1 shows a vehicle passing an interrogation station, the interrogation station illuminating the vehicles windshield with infrared light making the bar coded indicia carried by the windshield visible to appropriate detectors carried by the interrogation station.

FIG. 2 illustrates the vehicle and interrogation station of FIG. 1 as it looks to the unaided human eye and as it appears to the detectors when the windshield is subjected to natural light.

FIGS. 3A and 3B illustrate, in schematic form, the layered or sandwiched formation of the windshield of FIG. 1 with the intermediate layer, carrying the bar coded indicia. sandwiched between outer and inner layers of glass.

DETAILED DESCRIPTION OF THE PREFERRED EMBODIMENT

Referring now to FIGS. 1 and 2, a vehicle ID system 2 is shown with a vehicle 4 passing an interrogation station 6. Vehicle 4 includes a windshield 8 which carries bar coded indicia 10 over a substantial portion of its surface. Indicia 10 is preferably created in the form of a hologram which is invisible to the unaided human eye and thus has no effect upon incoming light through the windshield. However, indicia 10 is a sensitive to infrared light 12 directed towards windshield 8 by a transmitter (not separately shown). the transmitter being part of interrogation station 6.

Interrogation station 6 also includes a receiver (not separately shown) which senses the bar coded indicia bathed in infrared light 12. Interrogation station 6 is typically coupled to a central computer 14 where the information from interrogation station 6 is acted upon. The holographic indicia 10, the transmitter creating the infrared light 12, the receiver sensing indicia 10 and central computer 14 which acts on the information from the receiver can be of conventional design and thus will not be described in detail. See, for example, U.S. Pat. No. 4,386,979 to Ruell, the disclosure of which is incorporated by reference. It should be stressed that FIG. 1 illustrates the view of windshield 8 to interrogation station 6, not to the unaided human eye. Rather, windshield 8 remains clear to the user as shown in FIG. 2 whether interrogation station 6 is subjecting windshield 8 to infrared light 12 or not.

It is presently preferred to use infrared light created by $CO_2$ lasers. In addition to not being visible by the unaided human eye, this radiation is completely harmless to people and can be used at substantial distances.

Information from central computer 14 can be used for a wide variety of purposes, including toll taking, vehicle control, and wanted vehicle identification.

Indicia 10 is preferably placed on at least windshield 8. However, indicia 10 can be placed on one or more of side windows 16 and on rear window 18 in addition to or instead of windshield 8. An advantage of using windshield 8 for carrying indicia 10 is that the user must necessarily keep windshield 8 substantially clean for safety reasons; therefore, unlike the prior art system, obscuration of indicia 10 is not a problem.

FIG. 3 illustrates, in a schematic form, the positioning of an intermediate layer 20 between an outer layer 22 and an inner layer 24. Outer and inner layers 22, 24 are preferably glass while intermediate layer 20 acts as the carrier upon which bar coded indicia 10 is formed. Intermediate layer 20 preferably has bar coded indicia 10 formed as an infrared hologram. Appropriate clear organic materials, such as those used for making conventional safety glass for automobiles, are preferably incorporated into intermediate layer 20 so that upon the application of heat and pressure, a sandwiched safety window 26, including indicia 10, is created for use with vehicle 4.

Bar coded indicia is preferably unique for each vehicle 4. However, indicia 10 need not be unique for each vehicle 4. For example, indicia 10 may indicate a type of vehicle, such as a taxi cab, or that the vehicle belongs to a group or category, such as delivery trucks. More than one set of bar coded indicia 10 could be used on windows 8, 16 and 18 and may carry different information.

In use, vehicle 4 passes interrogation station 6 and has windshield 8 subjected to infrared light 12 from a transmitter portion of interrogation station 6. The receiver portion of interrogation station 6 reads bar coded indicia 10 on windshield 8 and provides this information to central computer 14 for further use. Vehicle 10 need not stop or slow down when passing interrogation station 6 and, in fact, is provided with visual indication that the identification of vehicle 4 has been monitored.

Modification and variation can be made to the disclosed embodiment without departing from the subject of the invention as defined in the following claims. Although a $CO_2$ laser is preferably used to read the infrared hologram installed as bar coded indicia 10, other types of infrared sources could e used as well. In addition, bar coded indicia 10 could be made to be sensitive to electromagnetic radiation other than infrared radiation. Interrogation station 6 could also be carried by another vehicle, such as a police, car, to provide the mobile monitoring of the identification of vehicles. It is preferred that interrogation station 6 actively illuminate windshield 8 with infrared light 12 for detection by the interrogation station. However, in appropriate circumstances ambient radiation may provide sufficient illumination of windshield 8 so that interrogation station 6 would only need a receiver to detect the special bar coded indicia 10 on windshield 8. For example, indicia 10 could be wavelength sensitive polarizing indicia which would permit most light to pass through the indicia (thus keeping the window clear as in FIG. 2) but reflect a narrow frequency range of radiation having a certain polarity; an approximate receiver could detect this reflected polarized radiation to sense indicia 10. Indicia other than bar coded indicia could be used as well.

WHAT IS CLAIMED IS:

1. A vehicle identification system, for use with a vehicle of the type including a window, the improvement comprising:
   said window being of a layered construction and including an outer layer, an intermediate layer and an inner layer: and
   the intermediate layer including identifying indicia which are invisible to the unaided human eye but are detectable when illuminated with a chosen electromagnetic radiation.

2. The system of claim 1 wherein the intermediate layer includes a plastic film and the inner and outer layers are glass.

3. The system of claim 1 wherein the identifying indicia are detectable using infrared light.

4. The system of claim 1 wherein said window is a windshield.

5. The system of claim 1 wherein said identifying indicia are in the form of bar coded indicia.

6. The system of claim 1 wherein the identifying indicia cover more than half of said window.

7. The system of claim 1 wherein the identifying indicia are unique to the vehicle.

8. The system of claim 1 wherein the identifying indicia are in the form of a hologram.

9. A method for identifying a vehicle, the vehicle having a window, comprising the following steps:
   providing the window with an identifying indicia layer sandwiched between inner and outer layers of the window, the identifying indicia on the identifying indicia layer being invisible to the unaided human eye but being detectable when illuminated with a chosen electromagnetic radiation;
   illuminating the window with the chosen electromagnetic radiation: and
   detecting the illuminated identifying indicia.

10. The method of claim 9 wherein the illuminating step is carried out using a source of infrared light.

11. The method of claim 9 wherein the illuminating step is carried out using the ambient electromagnetic radiation which includes the chosen electromagnetic radiation.

12. The method of claim 9 wherein the providing step is carried out by providing the identifying indicia layer on only a single window of the vehicle.

13. The method of claim 9 wherein the providing step is carried out using the identifying indicia in the form of holographic bar coded indicia.

14. The method of claim 9 wherein the providing step is carried out by providing at least a windshield of the vehicle with the identifying indicia layer.

15. The method of claim 9 wherein the illuminating step includes the step of scanning the window with a beam of the electromagnetic radiation.

16. The method of claim 9 wherein the detecting step includes sensing the identifying indicia based upon a pattern of reflected radiation from the identifying indicia.

17. A method for creating a vehicle window comprising the following steps:

selecting inner and outer window layers;

selecting an intermediate layer;

providing identifying indicia for the intermediate layer, the identifying indicia being invisible to the unaided human eye but being detectable when illuminated with a chosen electromagnetic radiation; and joining the inner, intermediate and outer layers into a unitary structure for use as the vehicle window with the intermediate layer being between the inner and outer layers.

18. The method of claim 17 wherein the identifying indicia is detectable using infrared light.

19. The method of claim 17 wherein the first selecting step is carried out using glass inner and outer window layers.

20. The method of claim 17 wherein the identifying indicia covers more than half of said vehicle window.

* * * * *